US012731207B2

(12) United States Patent
Xue et al.

(10) Patent No.: US 12,731,207 B2
(45) Date of Patent: Sep. 8, 2026

(54) EFFICIENT IMAGE WARPING SYSTEMS AND METHODS FOR OPTIMIZED PROCESSING AND MEMORY MANAGEMENT

(71) Applicant: Expedera, Inc., Santa Clara, CA (US)

(72) Inventors: Jeff Yu-Fan Xue, Dublin, CA (US); Athish Rahul Rao, San Jose, CA (US); Yaohung Chang, San Jose, CA (US); Cheng-Yu Ma, San Jose, CA (US); Shang-Tse Chuang, Taipei (TW)

(73) Assignee: Expedera, Inc., Santa Clara, CA (US)

( * ) Notice: Subject to any disclaimer, the term of this patent is extended or adjusted under 35 U.S.C. 154(b) by 152 days.

(21) Appl. No.: 18/758,802

(22) Filed: Jun. 28, 2024

(65) Prior Publication Data

US 2026/0004388 A1 Jan. 1, 2026

(51) Int. Cl.
*G06T 3/18* (2024.01)
*G06T 7/73* (2017.01)

(52) U.S. Cl.
CPC . *G06T 3/18* (2024.01); *G06T 7/73* (2017.01)

(58) Field of Classification Search
CPC .... G06T 3/18; G06T 7/73; G06T 1/60; G06T 3/4007; G06T 5/80; G06T 15/10; G06F 12/0862; G06F 17/16; G06F 12/0875; G06F 12/0877; G06F 2212/60; G06F 16/53; H04N 19/176; H04N 19/12; H04N 19/124; H04N 19/61; H04N 5/772; G02B 2027/011
See application file for complete search history.

(56) References Cited

U.S. PATENT DOCUMENTS

| | | | | |
|---|---|---|---|---|
| 7,589,738 | B2 * | 9/2009 | Candler | G06T 1/60 711/119 |
| 8,155,197 | B2 * | 4/2012 | Nakaishi | H04N 19/176 375/240.16 |
| 8,558,916 | B2 * | 10/2013 | Hayashi | H04N 23/667 348/231.1 |
| 10,042,773 | B2 * | 8/2018 | Wokhlu | G06F 12/0862 |
| 11,019,337 | B2 * | 5/2021 | Jun | H04N 19/152 |
| 11,263,723 | B2 * | 3/2022 | Chang | G06T 3/18 |
| 11,625,605 | B2 * | 4/2023 | Barker | G06N 3/084 706/20 |
| 11,875,154 | B2 * | 1/2024 | Elmalaki | G06F 9/30038 |
| 12,073,310 | B2 * | 8/2024 | Youn | G06F 9/4843 |
| 12,493,924 | B2 * | 12/2025 | Yan | G06T 3/4007 |
| 2005/0174346 | A1 * | 8/2005 | Park | G06T 15/04 345/422 |

(Continued)

*Primary Examiner* — Michael S Osinski
(74) *Attorney, Agent, or Firm* — Carr & Ferrell LLP

(57) ABSTRACT

Efficient image warping systems and methods for optimized processing and memory management are disclosed herein. A method for transforming digital images using coordinate transformations and Double Data Rate (DDR) memory optimizes processing and memory usage. The method receives an input image and a warp specification, fetches estimated source blocks from DDR memory based on the specification, and processes these blocks in cache memory optimized for random access. It addresses out-of-bounds pixel issues by adjusting the range of source blocks, ensuring accurate assembly of the warped image. This approach improves efficiency in digital image warping, particularly in real-time applications.

20 Claims, 8 Drawing Sheets

(56) References Cited

U.S. PATENT DOCUMENTS

| | | | | |
|---|---|---|---|---|
| 2005/0195200 | A1* | 9/2005 | Chuang | G06F 12/0875 345/519 |
| 2006/0015686 | A1* | 1/2006 | Candler | G06F 12/0875 711/119 |
| 2009/0033760 | A1* | 2/2009 | Oh | H04N 5/772 348/222.1 |
| 2009/0087115 | A1* | 4/2009 | Wong | G06T 5/80 382/303 |
| 2009/0195542 | A1* | 8/2009 | Kawamura | G09G 5/14 345/422 |
| 2009/0198865 | A1* | 8/2009 | Arimilli | G06F 12/0822 711/3 |
| 2010/0070697 | A1* | 3/2010 | Saito | H04N 1/32358 711/E12.001 |
| 2013/0108187 | A1* | 5/2013 | Tsai | G06T 3/18 382/295 |
| 2013/0254485 | A1* | 9/2013 | Kannan | G06F 12/0862 711/E12.024 |
| 2016/0379360 | A1* | 12/2016 | Ito | G06T 7/0004 382/152 |
| 2017/0178288 | A1* | 6/2017 | Adaszewski | G06T 19/006 |
| 2020/0014955 | A1* | 1/2020 | Grangetto | H04N 19/61 |
| 2020/0334286 | A1* | 10/2020 | Hwang | G06F 9/466 |
| 2022/0124310 | A1* | 4/2022 | Kang | H04N 19/105 |
| 2022/0301099 | A1* | 9/2022 | Cebron | G06T 3/18 |
| 2023/0334615 | A1* | 10/2023 | Livesley | G06T 1/60 |
| 2024/0237082 | A1* | 7/2024 | Lim | H04W 74/0833 |
| 2024/0388690 | A1* | 11/2024 | Chen | H04N 19/176 |
| 2025/0016347 | A1* | 1/2025 | Jhu | H04N 19/105 |
| 2025/0285282 | A1* | 9/2025 | Kimura | G06T 7/11 |
| 2026/0004410 | A1* | 1/2026 | Wang | G06T 5/80 |

* cited by examiner

EFFICIENT IMAGE WARPING SYSTEMS AND METHODS FOR OPTIMIZED PROCESSING AND MEMORY MANAGEMENT

CROSS-REFERENCE TO RELATED APPLICATIONS

Not applicable.

FIELD

The present disclosure pertains to the technical field of digital image processing, more specifically, but not by way of limitation, to techniques for warping images using warp transformations. The systems and methods are pertinent for applications requiring image manipulation, such as graphical user interfaces, augmented reality systems, and other multimedia applications.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for efficient image warping utilizing double data rate (DDR) memory. The method also includes receiving an input digital image stored within DDR memory and a warp specification that includes a set of coordinate transformations by a processor of a computing device; fetching an estimated range of source blocks within the DDR memory that correspond to an output block of the warped image based on the warp specification, where the estimated range accounts for potential warp-induced displacements of pixels; obtaining the estimated range of source blocks from the DDR memory into cache memory optimized for random access operations; generating warped image blocks by applying the set of coordinate transformations to pixels within the estimated range of source blocks, where each warped image block corresponds to a portion of the warped image; and assembling the warped image from the generated warped image blocks and transmitting the assembled warped image to be further processed by another compute unit or stored in the DDR memory. Other embodiments of this aspect include corresponding computer systems, apparatus, and computer programs recorded on one or more computer storage devices, each configured to perform the actions of the methods.

Implementations may include one or more of the following features. The method may include: identifying displacement requirements for source image blocks by analyzing the warp specification; and dynamically adjusting the estimated range of source blocks to encompass determined pixels for generating each output block, considering potential warp-induced displacements within the DDR memory based on the coordinate transformations specified in the warp specification. The method may include managing access to DDR memory by strategically fetching source blocks in anticipation of their use in the warping process, thereby addressing potential out-of-bounds pixel scenarios and enhancing processing efficiency through reduced memory fetch operations. Generating warped image blocks involves transforming source image blocks based on the warp specification to produce portions of the warped image, ensuring continuity and integrity of the image data during the warping process. The method may include managing the fetched source blocks within the cache memory to support efficient access during the image warping process. The method may include assessing the output blocks to ensure conformity with expected outcomes of the warp specification to facilitate the identification and correction of discrepancies in the warped image. Adjustments to the warp specification are made to optimize the warping process in response to identified requirements for memory access efficiency and accuracy in the generation of warped image blocks. The method may include: detecting any out-of-bounds (OOB) pixel coordinates that result from applying the warp specification, which indicate source blocks falling outside the estimated range; and in response to detecting OOB pixel coordinates, expanding the estimated range of source blocks to include additional blocks from the DDR memory that encompass the OOB pixel coordinates, and repeating the fetching, generating, and assembling steps for the expanded range. The method may include recalculating the estimated range of source blocks to preemptively incorporate any potential OOB pixel coordinates, ensuring comprehensive coverage of necessary source blocks from the DDR memory in a single operation. Implementations of the described techniques may include hardware, a method or process, or computer software on a computer-accessible medium.

One general aspect includes a method for image warping in a computing device. The method also includes receiving an input digital image stored within memory and a warp specification that includes a set of coordinate transformations; fetching an estimated range of source blocks within the memory that correspond to an output block of the warped image based on the warp specification, where the estimated range accounts for potential warp-induced displacements of pixels; obtaining the estimated range of source blocks from the memory into a cache; generating warped image blocks by applying the set of coordinate transformations to pixels within the estimated range of source blocks, where generating includes interpolating pixel values at destination coordinates; and assembling the warped image from the generated warped image blocks and storing the assembled warped image back into memory. Other embodiments of this aspect include corresponding computer systems, apparatus, and computer programs recorded on one or more computer storage devices, each configured to perform the actions of the methods.

Implementations may include one or more of the following features. The method where fetching an estimated range of source blocks includes calculating the range based on the corners of the output block as influenced by the warp specification. The method may include checking for presence of out-of-bounds (OOB) pixels that may result from applying the set of coordinate transformations, and adjusting the estimated range of source blocks accordingly to include any such OOB pixels. Obtaining the estimated range of source blocks from the memory into a cache further may include updating the cache with the fetched source blocks to facilitate generating warped image blocks. Generating warped image blocks further involves adjusting pixel coordinates within the estimated range of source blocks before applying the set of coordinate transformations. The method may include recalculating the estimated range of source blocks if the initial estimation does not fully encompass the necessary data for generating the warped image blocks due to warp-induced displacements. Assembling the warped image from the generated warped image blocks includes sequentially placing the blocks according to their transformed coordinates to form the complete image. Implementations of the described techniques may include hardware, a method or process, or computer software on a computer-accessible medium.

One general aspect includes a system for efficient image warping utilizing double data rate (DDR) memory. The system also includes a processor; and a memory architecture configured to stored instructions that are executed by the processor to: receive an input digital image stored within DDR memory and a warp specification that includes a set of coordinate transformations by a processor of a computing device; fetch an estimated range of source blocks within the DDR memory that correspond to an output block of the warped image based on the warp specification, where the estimated range accounts for potential warp-induced displacements of pixels; obtain the estimated range of source blocks from the DDR memory into cache memory optimized for random access operations; generate warped image blocks by applying the set of coordinate transformations to pixels within the estimated range of source blocks, where each warped image block corresponds to a portion of the warped image; and assemble the warped image from the generated warped image blocks and storing the assembled warped image in the DDR memory. Other embodiments of this aspect include corresponding computer systems, apparatus, and computer programs recorded on one or more computer storage devices, each configured to perform the actions of the methods.

Implementations may include one or more of the following features. The method may include dynamically adjusting the estimated range of source blocks within the DDR memory based on the warp specification to include determined pixels for generating each output block, managing access to DDR memory by strategically fetching source blocks to enhance processing efficiency, and expanding the estimated range to include additional blocks that encompass out-of-bounds (OOB) pixel coordinates detected from applying the warp specification. The method may include transforming source image blocks based on the warp specification to produce warped image blocks, ensuring continuity and integrity of the image data during the warping process, and managing the fetched source blocks within cache memory to support efficient access and facilitate the identification and correction of discrepancies in the warped image. The method may include preemptively recalculating the estimated range of source blocks to incorporate any potential OOB pixel coordinates, ensuring comprehensive coverage of necessary source blocks from the DDR memory in a single operation, and making adjustments to the warp specification to optimize the warping process in response to identified requirements for memory access efficiency and accuracy in the generation of warped image blocks. Implementations of the described techniques may include hardware, a method or process, or computer software on a computer-accessible medium.

BRIEF DESCRIPTION OF THE DRAWINGS

Exemplary embodiments are illustrated by way of example and not limited by the figures of the accompanying drawings, in which references indicate similar elements.

DETAILED DESCRIPTION OF EXAMPLE EMBODIMENTS

Overview

Figure 1:
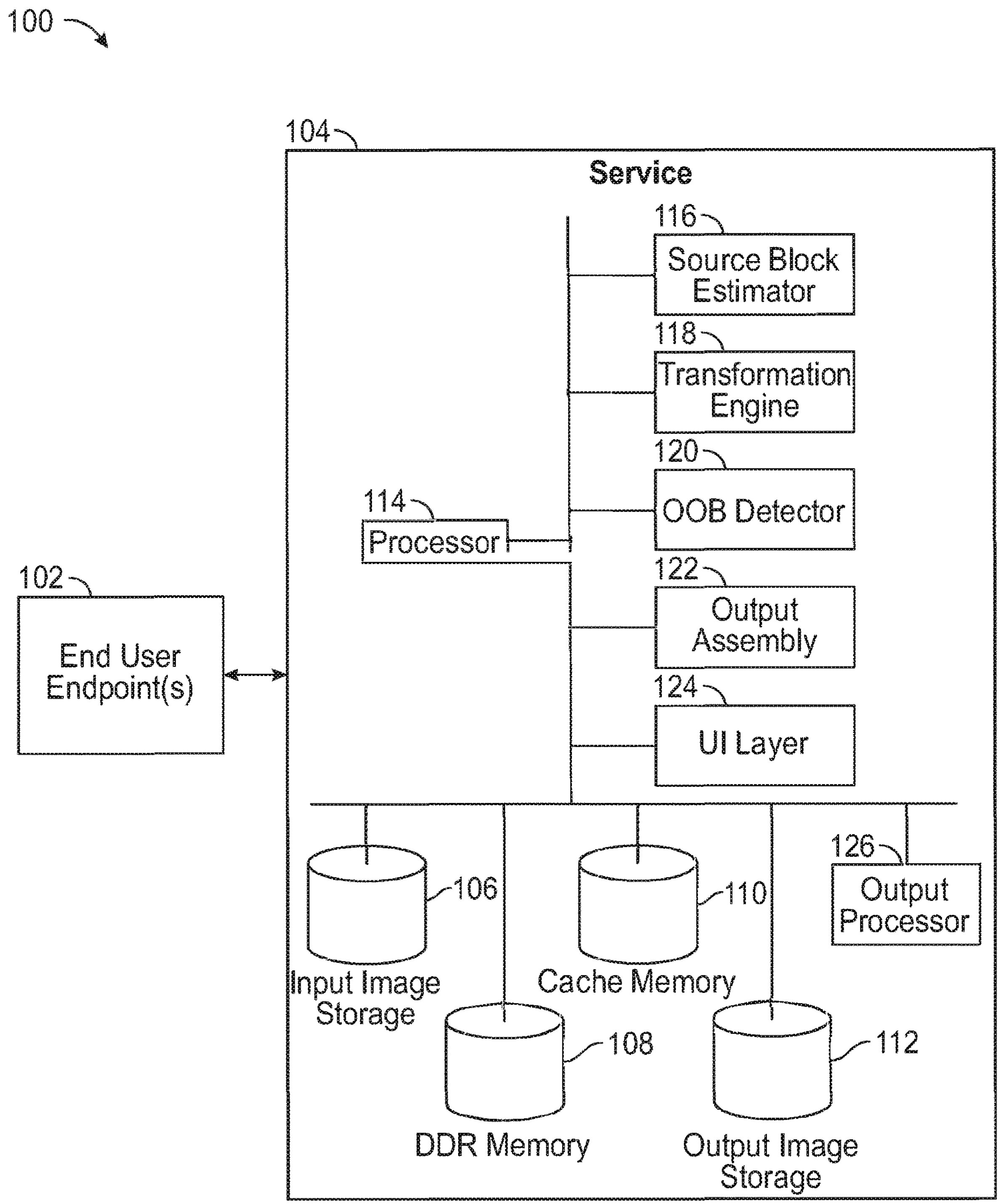
FIG. 1 is an example architectural environment where aspects of the present disclosure can be practiced.

The disclosed technology is directed, in some instances, to a method that efficiently utilizes Double Data Rate (DDR) memory for image warping. This method specifically addresses and overcomes key challenges associated with image transformation (e.g., warping) processes, such as high processing latency, memory inefficiency, and maintaining the accuracy and quality of the warped image.

Traditionally, image warping, which entails transforming an image based on specified coordinate mappings to adjust pixel positions, has been constrained by the computational burden of recalculating pixel positions and values. This is especially problematic in applications requiring real-time responsiveness. Furthermore, the need to access and process large volumes of image data exacerbates memory bandwidth utilization and power consumption, issues that are particularly pronounced when leveraging DDR memory. Ensuring the fidelity of the warped image while preventing common artifacts like tearing or stretching also presents significant hurdles.

Addressing these challenges, the technology includes the processor receiving an input digital image along with a warp specification detailing the coordinate transformations for the desired warping effect. In one embodiment, the method includes estimating which blocks of image data from the DDR memory will correlate with the sections of the post-transformation image. This predictive fetching is designed to account for potential pixel displacements, ensuring comprehensive and efficient data retrieval.

By transferring these precisely estimated source blocks into cache memory optimized for random access, the method substantially reduces access and manipulation times. This step is used to lower processing latency, thus accelerating the warping process significantly.

Moreover, the technology is configured to dynamically adjust for any out-of-bounds pixel coordinates that emerge from the warping process. Detecting such discrepancies prompts the method to expand the range of source blocks considered, fetching additional data as necessary to encompass relevant image information. This ensures the integrity and completeness of the final warped image, maintaining high accuracy and visual quality. The disclosed methods not only solve issues of latency, memory usage, and image accuracy in digital warping but also leverage the capabilities of DDR memory more effectively.

A significant challenge identified in the field of image warping involves the inefficient data composition and access within DDR memory, which serves as the primary storage for image data during the warping process. The structural constraints of DDR memory, designed for storing data in structured pages, may not align well with the needs of image warping, where coordinate transformations dictate a more randomized access pattern, particularly at granularities of 2×2 or 4×4 pixel blocks. This misalignment leads to inefficient and power-intensive random-access operations, exacerbating the challenges of memory bandwidth utilization and power consumption.

The disclosed technology introduces a specialized methodology that addresses these inefficiencies by optimizing the way data is accessed and processed within the DDR memory framework. This includes reconstructing blocks of the source image from DDR memory in a way that supports efficient random addressing, specifically tailored for the warping process. By focusing on processing one output block at a time and accurately estimating the necessary range of source blocks needed for transformation, the technology significantly improves data throughput and reduces power consumption associated with random access.

Moreover, the technology incorporates exception handling mechanisms for instances where warp coordinates fall outside the initially estimated source block range. Through the strategic reloading of source blocks using out-of-bounds coordinates, the methodology ensures that even in extreme warping conditions, the integrity and accuracy of the warped image are maintained, with a negligible impact on processing efficiency and memory utilization. This approach not only mitigates the specific challenges of data composition and access in DDR memory but also enhances the overall performance and effectiveness of the image warping process.

EXAMPLE EMBODIMENTS

FIG. 1 is a schematic diagram of an example architecture 100 that can be used to practice aspects of the present disclosure. The architecture 100 can include one or more end user endpoints 102 that can include any computing device utilized by a user to interact with an image warp service (service 104).

In some instances, the architecture 100 can include an input image storage 106, DDR memory 108, cache memory 110, and output image storage 112. The service 104 can include a processor 114, a source block estimator 116, a transformation engine 118, an out-of-bounds (OOB) detector 120, an output assembly 122, and a user interface/application layer 124.

In more detail, the input image storage 106 serves as the initial repository for digital images awaiting processing. It can include solid-state drives, hard disk drives, or any non-volatile memory that maintains data integrity without power. Its primary function is to safely store raw image data until the processor is ready to execute the warping algorithm. In the context of image warping, this storage must provide fast read operations to ensure efficient throughput. The input image storage 106 communicates directly with the processor 114, sending image data upon request.

The input image storage 106 typically receives images from a variety of sources depending on the system's application. These sources can include digital cameras, scanners, image capture devices, network transfers from other storage locations, or direct user uploads. For example, in a surveillance system, the images might come directly from connected cameras. In graphic design or medical imaging systems, they might be uploaded by users or transferred from other devices within a network. The input image storage 106 would be configured to accept data in the appropriate digital formats and protocols that are standard within the specific industry or application. It ensures that images are available for retrieval and processing by the image warping system in a consistent and accessible manner.

DDR memory 108 interfaces directly with the processor 114 to facilitate rapid read and write operations. This type of memory is selected for its ability to handle two data transfers per clock cycle, effectively doubling the data rate compared to its predecessors. DDR memory 108 is the main workspace for the processor 114 during the image warping process. It stores the digital images received from the input image storage 106 and retains the warped images produced after processing. In a typical operation, the processor 114 retrieves blocks of image data from the DDR memory 108, applies warping transformations, and then sends the processed blocks to a processing unit or writes the processed blocks back into the memory. This iterative process continues until the entire image has been warped, processed or stored according to the specifications.

The warped images stored in the DDR memory 108 are then either transferred to output image storage 112 for long-term retention or output directly for immediate use, such as displaying on a screen or further image processing by output processor 126. The transfer to output image storage 112 is typically done via high-speed data buses that can handle large volumes of data without creating bottlenecks. This ensures that the system can maintain a high throughput, especially in applications where image processing is time-sensitive, such as real-time video streaming or medical imaging diagnostics.

As noted above, the present disclosure introduces an approach to addressing the inherent inefficiencies associated with data composition and access within DDR memory. One challenge encountered in traditional image warping processes is the misalignment between the structural constraints of DDR memory—primarily designed for structured data storage—and the dynamic access patterns necessitated by coordinate transformations during image warping. This misalignment often results in inefficient, power-intensive random-access operations, thereby exacerbating memory bandwidth utilization and power consumption issues.

To overcome these challenges, the systems and methods disclosed optimize the way data is accessed and processed within the DDR memory framework, specifically by reconstructing blocks of the source image in a manner that supports efficient random addressing. This reconstruction process is configured to accommodate the warping process, focusing on processing one output block at a time and accurately estimating the necessary range of source blocks required for transformation. As a result, data throughput is improved and power consumption associated with random access is minimized, enhancing the overall efficiency of the image warping process.

The cache memory 110 is used in optimizing the performance of the image warping system, especially in the context of working alongside DDR memory 108 and the processor 114. The cache memory 110 acts as a high-speed intermediary storage layer that temporarily holds data likely to be reused by the processor 114. Given its faster access times compared to DDR memory 108, cache memory 110 reduces data access latency, enhancing the system's overall efficiency.

In the process of image warping, the processor 114 frequently accesses specific blocks of image data multiple times due to the nature of coordinate transformations and pixel interpolations involved. By storing these frequently accessed data blocks in the cache memory 110, the service minimizes the number of time-consuming reads and writes to the slower DDR memory 108. This is particularly useful when applying complex warping algorithms that require iterative processing of image data.

When the processor 114 requests data, it first checks if the needed data resides in the cache memory 110. If present (a cache hit), the data can be quickly fetched and used for processing, bypassing the slower DDR memory 108 access. If the data is not in the cache memory 110 (a cache miss), the data are retrieved from the DDR memory 108 and also stored in the cache memory 110 for potential future access. The cache memory 110 thus serves as a buffer that adapts to the processor's 114 data access patterns, storing and providing rapid access to the most relevant data blocks based on the warping specification.

After processing, the data (now in the form of warped image blocks) can be temporarily held in the cache memory 110 before being written back to the DDR memory 108. This approach allows for batching of write operations, which can be more efficient than writing individual blocks as they are processed.

By intelligently managing data placement between the cache memory 110 and DDR memory 108, the service can achieve a significant reduction in processing times, enabling real-time or near-real-time performance for applications requiring fast image manipulation, such as video processing, augmented reality systems, and real-time surveillance analytics.

The cache memory facilitates immediate retrieval of data as the processor 114 applies the set of coordinate transformations to generate the warped image blocks. This optimization is used to maintain a fluid and efficient workflow, especially when the warping process involves complex transformations that require rapid, often non-sequential, memory accesses.

By leveraging the optimized capabilities of cache memory, the processor 114 can access the necessary pixel data with minimal delay. This optimization is used to accelerate the entire image warping operation, allowing for the dynamic and efficient application of warp specifications to large images or those requiring intricate processing. The strategic use of cache memory, thus, not only enhances the performance of the warping process but also significantly contributes to the system's overall efficiency by minimizing processing times and ensuring the high-speed execution of warping transformations.

The disclosed image warping system, as represented by service 104, encompasses a suite of integrated components designed to perform efficient image warping operations. Each component plays a role in the overall process, from receiving and processing the input image to delivering the warped image output. The following describes functionalities, interactions, and data flow among the processor 114, source block estimator 116, transformation engine 118, out-of-bounds (OOB) detector 120, output assembly 122, and user interface/application layer 124. To be sure, these features can be stand-alone components or can be integrated into a single service as distinct or combined modules.

Processor 114 serves as a central processing unit of the service 104, orchestrating the image warping process. It receives digital images and warp specifications from the input image storage 106. The processor 114 interprets the warp specifications, which define the coordinate transformations needed to achieve the desired warping effect. It then coordinates the execution of these transformations by managing the flow of data between the other components of service 104. The processor 114 interfaces with the source block estimator 116 to determine the necessary source blocks from DDR memory 108, directs the transformation engine 118 to apply the warp transformations, and works with the OOB detector 120 to ensure all relevant image data is accurately processed.

The source block estimator 116, under the direction of processor 114, calculates which blocks of image data stored within DDR memory 108 correspond to segments of the target warped image. It uses the warp specifications to predict potential pixel displacements, ensuring that the processor 114 fetches those source blocks that contribute to the final warped image. This predictive fetching mechanism is used for optimizing memory access patterns and reducing unnecessary data retrieval.

Following the identification of relevant source blocks by the source block estimator 116, the transformation engine 118 applies the specified coordinate transformations to the pixels within these blocks. It manipulates pixel values based on the warp specifications, generating the warped image blocks. The transformation engine 118 employs algorithms, including interpolation techniques, to ensure a high-quality warping effect with minimized artifacts such as tearing or stretching.

As the transformation engine 118 processes image blocks, the OOB detector 120 monitors for pixel coordinates that exceed the bounds of the originally estimated source blocks. This scenario can arise due to the dynamic nature of image warping, where certain transformations push pixel data beyond the anticipated ranges. When such out-of-bounds occurrences are detected, the OOB detector 120 signals the processor 114 to adjust the range of source blocks required, ensuring no image data is missed.

The output assembly 122 is responsible for compiling the individual warped image blocks into a cohesive output image. The output assembly 122 arranges the warped blocks according to their designated positions within the overall image frame, effectively reconstructing the image post-transformation. This assembly process ensures that the final warped image is ready for storage, output processing or display.

The user interface/application layer 124 provides a means for users or external applications to interact with service 104. Through this interface, users can input warp specifications, initiate the warping process, and retrieve the processed images. It acts as the entry and exit point for data, linking the internal components of service 104 with an external environment. In some instances, an exit point for data is an NPU that performs AI post-processing.

Figure 2:
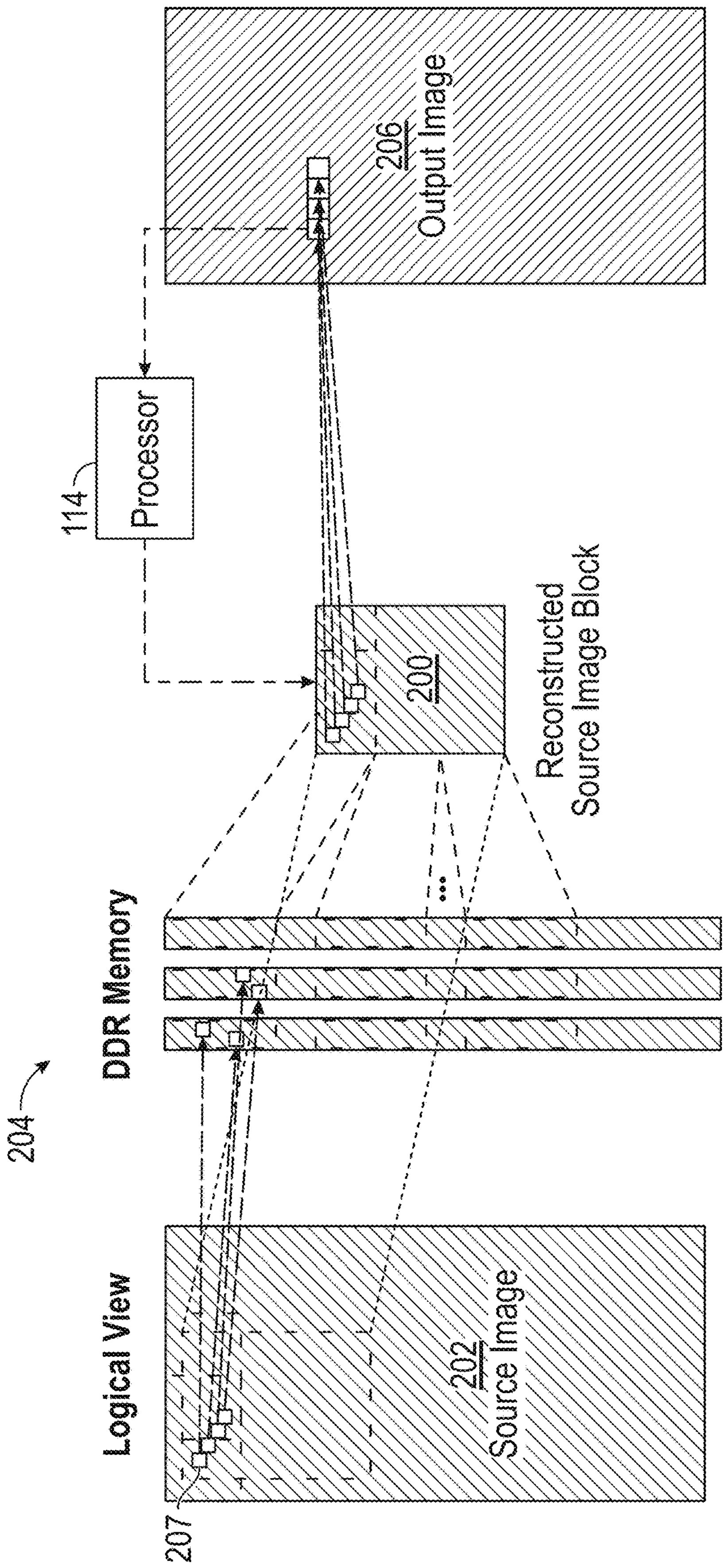
FIG. 2 is a diagrammatic flow of an example methodology, illustrating the flow of data from the source image through DDR memory.
Figure 3:
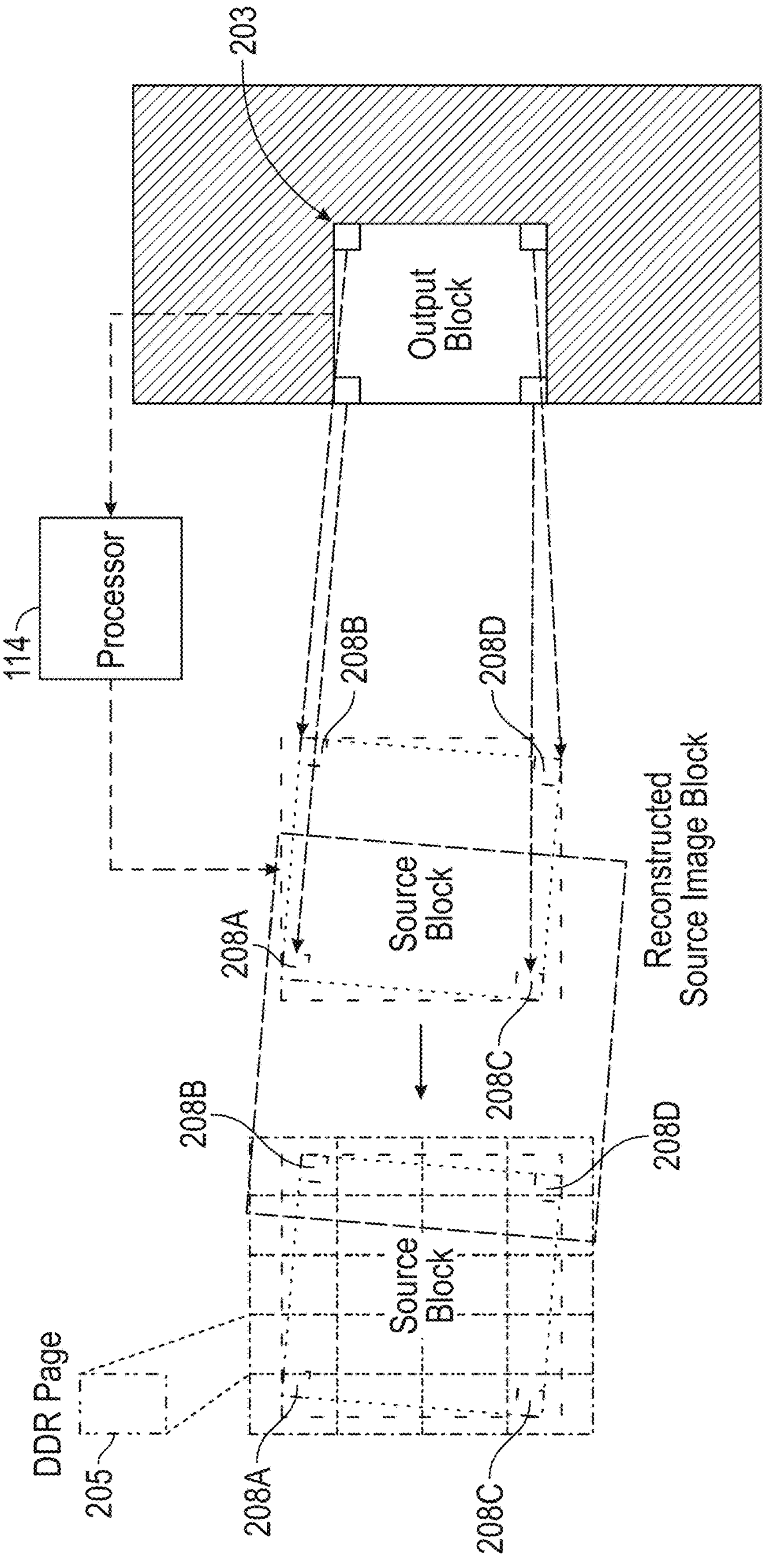
FIG. 3 is a diagrammatic flow of another method of decision logic, for block memory exceptions.

Referring now to FIGS. 2 and 3 collectively, some embodiments include reconstructing blocks of source image data from Double Data Rate (DDR) memory for optimized random addressing. This methodology facilitates the warping process by allowing the processor to efficiently access and transform the necessary data with reduced latency and increased throughput.

To enhance system performance, a reconstructed block 200 of the source image 202 is first generated from DDR memory 204. This step involves selecting and organizing specific portions of the source image 202 data into a format conducive for random addressing by a warp engine (e.g., processor 114). This preprocessing of data is useful in overcoming the structural limitations of DDR memory 204, which traditionally stores data in structured pages (such as DDR page 205) that are not well-suited for the randomized access patterns required by image warping transformations.

The processor 114 then operates on this reconstructed block 200. It applies the coordinate transformations dictated by the warp specifications to alter the image as desired. This process is conducted on one output block 203 at a time (see FIG. 3), enhancing efficiency and ensuring that system resources are optimally allocated during the image warping process.

FIG. 2 illustrates the logical view of an example methodology, illustrating the flow of data from the source image 202 through DDR memory 204, leading to the processor 114 and culminating in the output image 206. In some instances, reconstructed source image blocks are placed within the DDR memory 204 to streamline the warping process. The processor 114 accesses these blocks, applies the necessary transformations, and generates the warped output image, which is a recomposition of the original source image based on the provided warp matrix/specifications. In general, this process includes moving pixels, such as pixel 207 from DDR memory to create the reconstructed source image blocks. As noted above, this can include moving the data from DDR memory to cache memory.

Particularly advantageous is the block memory evaluation process where the processor 114 estimates a source block range needed using corner pixels 208A-208D of the output block 214, as illustrated in FIG. 3. This predictive strategy effectively determines the data necessary for the transformation, minimizing wasted computation on irrelevant image sections. The source block range can be expanded to include the corresponding DDR blocks, ensuring that all potential data needed for accurate warping is available to the warp engine.

Figure 4:
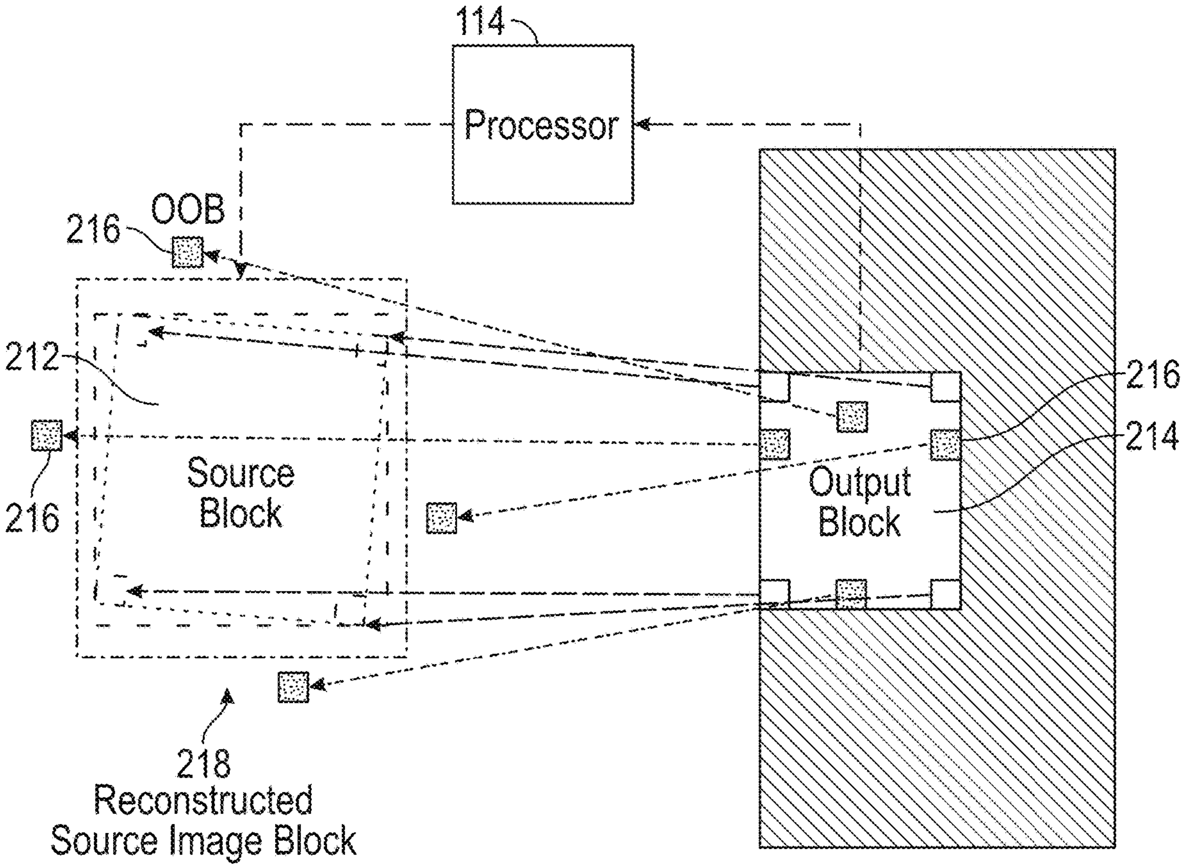
FIG. 4 illustrates the concept of block memory exceptions in the context of an image warping process.

The methodology further accounts for block memory exceptions as illustrated in FIG. 4. In scenarios where a warp coordinate falls outside the estimated source block—referred to as an out-of-bounds (OOB) occurrence—the processor 114 considers it an exception. These exceptions typically manifest under extreme warping conditions and require additional handling to maintain image integrity.

In the depicted scenario, the processor 114 performs a coordinate transformation on a source image block 212 to produce an output block 214. During this operation, certain warp coordinates may exceed the bounds of the source block. These coordinates are labeled as OOB and are identified by hashed icons 216. These OOB instances are exceptions to the normal processing flow because they require image data that is not contained within the current source block.

The occurrence of OOB pixels is a rare event, typically happening under extreme warping conditions, with the image specifying that such instances have a likelihood of less than 0.01%. This low probability indicates that the processing logic of the processor 114 is robust enough to handle most transformations without encountering out-of-bounds issues.

A reconstructed source image block 218 refers to the segment of the source image that has been prepared and adjusted to include any OOB data necessary for the transformation. This ensures that when the source block is processed by the processor 114, all necessary pixel data is available for a correct and complete mapping onto the output block.

The output block 214 represents the segment of the output image that will receive the transformed pixel data. The processor 114 uses the warp coordinates to map the source block's pixels to their new locations in the output block, forming part of the final warped image.

Figure 5:
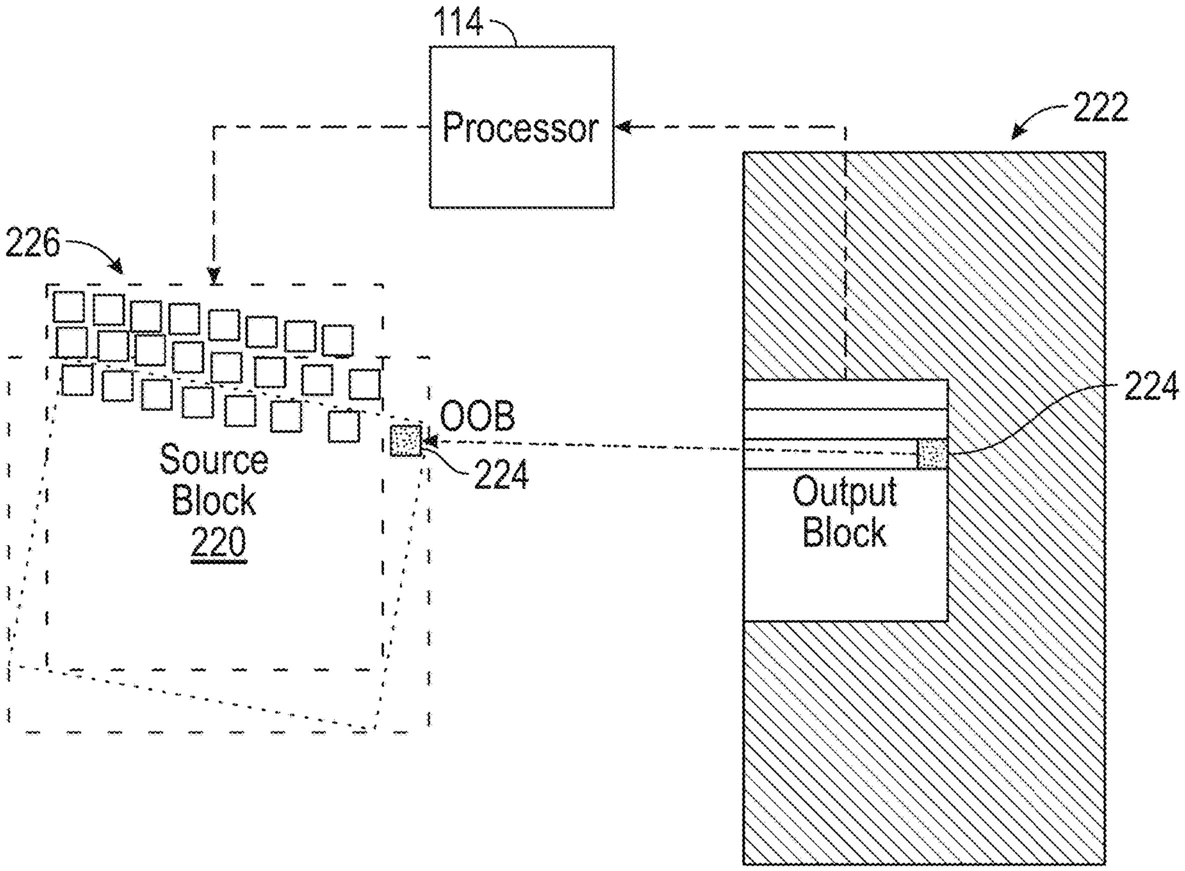
FIG. 5 is a diagrammatic flow of a method for managing exceptions in memory blocks during the image warping process.

Block memory exception handling methods are integrated to address OOB occurrences efficiently. One approach (as illustrated in FIG. 5) involves reloading the source block using the OOB coordinate as one of the new corner coordinates, effectively adjusting the range of data under consideration.

In some instances, the service provides dynamic adjustment for OOB pixel coordinates utilizing DDR memory. An example process begins when the OOB detector 120 (see FIG. 1) encounters OOB pixel coordinates as a result of applying the specified coordinate transformations during the warping process. Such occurrences signify that the initial estimation of source blocks does not fully capture all determined pixels for the transformation, potentially impacting the integrity of the final warped image.

Upon detecting these OOB pixel coordinates, the processor 114 takes steps to adjust the range of source blocks considered. Specifically, it expands the estimated range to include additional source blocks from the DDR memory 108 (see FIG. 1), ensuring that these newly included blocks encompass the OOB pixel coordinates. This expansion is used to capture relevant image data that was initially outside the estimated range, preventing any loss of visual information in the warped image.

The method involves a repeated fetching, generating, and assembling of image blocks for the expanded range, ensuring that the processor re-evaluates the necessary data to include the previously out-of-range pixels. Through this dynamic adjustment, the processor 114 ensures the completeness and accuracy of the warped image, maintaining high visual quality despite the challenges posed by complex warping transformations.

FIG. 5 illustrates the concept of block memory exceptions in the context of an image warping process. The processor 114 is tasked with transforming an input source image into a warped output image according to specified warp coordinates. The source block 220, represents a segment of the source image data that has been prepared for processing by the processor 114. This preparation involves organizing the data to be accessed efficiently during the warping operation.

The processor 114 applies transformation logic to each block, in order to map it onto an output block 222 as part of the resulting warped image 226. An OOB exception 224 is highlighted, where a warp coordinate falls outside the boundary of the source block. This indicates a case where the transformation by the processor 114 would require image data not currently included within the selected source block.

The reconstructed source image block, shows the section of the source image that has been accessed and is ready to be processed. The reconstructed block is adjusted to include the OOB pixel data (expanded range of source block data), thereby ensuring that all relevant data is used for the transformation and the integrity of the output image is maintained. The output block represents the area in the output image where the transformed data from the source block will be placed.

Figure 6:
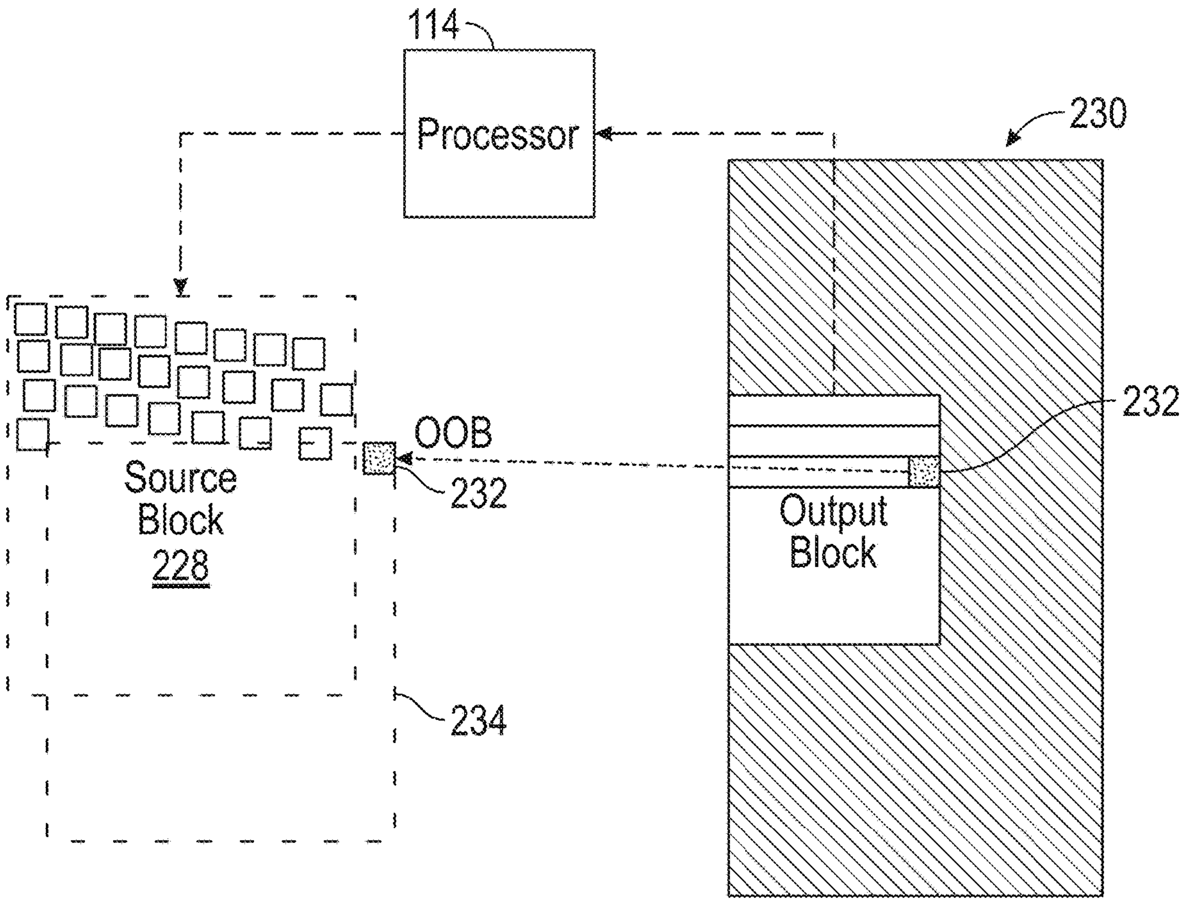
FIG. 6 is a diagrammatic flow of another method for managing exceptions in memory blocks during the image warping process.

Another method, illustrated in FIG. 6, is used for managing exceptions in memory blocks during the image warping process. This method is employed when a warp coordinate, corresponding to a pixel location in the source image, extends beyond the boundary of a predefined source block, resulting in an out-of-bounds (OOB) condition.

The flow illustrates a source block 228 from which image data is extracted for warping, the processor 114 that applies transformation algorithms to the image data, and an output block 230 where the transformed image data is intended to be placed. The OOB occurrence 232 signifies a pixel that resides outside the anticipated range of the source block due to the applied warping transformation.

To address the occurrence of OOB pixels, the disclosed method includes a step for reloading the source block utilizing an OOB coordinate(s) as a reference point. This reference point establishes a new boundary for source block retrieval, ensuring that all necessary image data is encompassed for accurate and complete image transformation. The reloaded source block boundary 234 is thus redefined to include the OOB warp coordinate.

This methodology facilitates the handling of exceptions by dynamically adjusting the data retrieval boundaries, allowing for the complete reconstruction of the warped image with high fidelity, despite the presence of extreme warping transformations that may push certain pixels beyond the initially estimated boundaries of the source blocks. Through this adaptive approach, the integrity of the warped image is preserved, with minimal impact on the processing efficiency and resource utilization.

In general, the exception handling mechanisms are used to address scenarios where warp coordinates fall outside the initially estimated source block range. Such situations may arise during the application of complex coordinate transformations, potentially leading to the exclusion of critical pixel data necessary for accurately reconstructing the warped image.

When discrepancies due to out-of-bounds (OOB) warp coordinates are detected, the processor employs strategic measures to adjust its processing approach, notably through the reloading of source blocks. This reloading involves expanding the estimated range of source blocks to incorporate additional blocks from DDR memory, ensuring these blocks cover the areas indicated by the OOB coordinates. This dynamic adjustment enables the system to encapsulate relevant image data, preserving the integrity and completeness of the final warped image.

Figure 7:
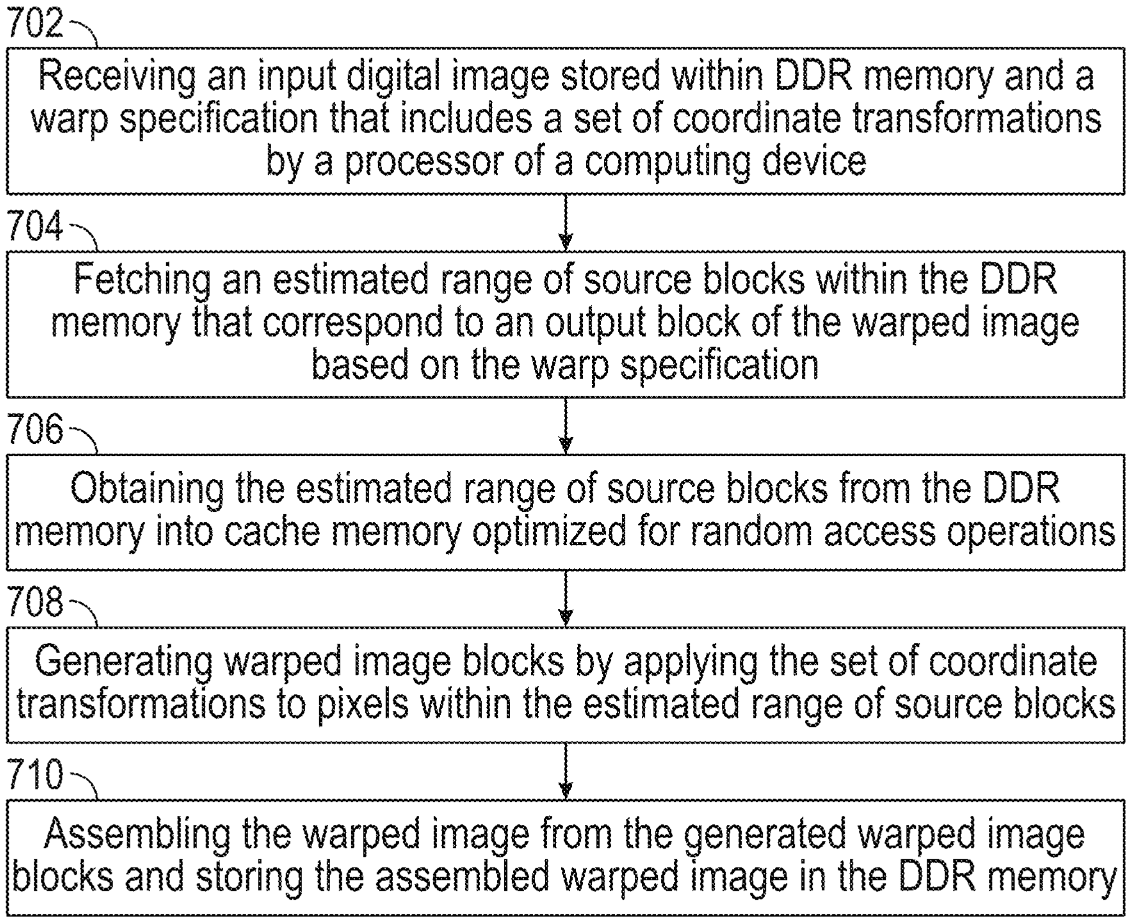
FIG. 7 is a flowchart of an example method executed by the processor.

FIG. 7 is a flowchart of an example method executed by the processor 114. This example method is for efficient image warping utilizing DDR memory. The method can include a step 702 of receiving an input digital image stored within DDR memory and a warp specification that includes a set of coordinate transformations by a processor of a computing device. The image is stored within a computing device's DDR memory, a type of storage that is favored for its efficiency and speed in handling large amounts of data. DDR memory, by design, allows for faster data transactions, making it suitable for processes requiring the rapid manipulation and transformation of image data. Alongside the input image, the system also receives a warp specification. This specification is essentially a blueprint that dictates how the image should be transformed. It comprises a set of coordinate transformations that are to be applied to the input image. These transformations are designed to warp or alter the image in a predefined manner, adjusting its shape or structure according to the requirements of the application at hand.

The method then includes a step 704 of fetching an estimated range of source blocks within the DDR memory that correspond to an output block of the warped image based on the warp specification. To be sure, the estimated range accounts for potential warp-induced displacements of pixels.

This step involves identifying and retrieving specific segments of the input image that are pertinent to creating a single output block in the warped image. The "estimated range" of these source blocks is determined based on the warp specification provided. This involves a calculation where the processor evaluates which parts of the input image will be transformed into the designated output block, considering the coordinate transformations outlined in the warp specification.

The necessity of accounting for potential warp-induced displacements of pixels is one aspect of this process. Warp-induced displacements refer to the phenomenon where, as a result of applying the coordinate transformations, pixels from the input image may not align directly with their new position in the output image. Instead, their positions are shifted in a manner dictated by the warping process. This shift can lead to scenarios where the pixels needed to create a part of the warped image are located in a different segment of the input image than initially estimated. As such, the process involves not just a simple one-to-one fetching of source blocks based on static locations but a dynamic adjustment to ensure that all necessary pixels, including those displaced by the warp, are included in the fetched range.

By dynamically adjusting which portions of the DDR memory are accessed based on the warp specification, the method ensures that the final warped image maintains the integrity of the original visual content, even if it undergoes significant transformation.

In some instances, a strategic approach is employed for the predictive fetching of source blocks. This method involves estimating the shifts in pixel positions that occur as a direct consequence of applying the specified coordinate transformations, inherent to the warp specification. Central to this approach is the anticipation of how such transformations influence the relocation of pixels within the image, ensuring the accurate selection and retrieval of only those source blocks from the DDR memory that are essential for constructing the desired output block of the warped image.

The methodology delineates a precise mechanism for identifying the estimated range of source blocks within the DDR memory. This range is calculated based on the anticipated shifts in pixel positions, dictated by the warp specification. By doing so, the method enhances the efficiency of the memory fetching process, mitigating unnecessary data retrieval and optimizing the use of DDR memory. Consequently, this predictive fetching strategy not only facilitates a reduction in processing latency but also contributes to the overall acceleration of the image warping process, ensuring that the transformed image is both accurate and of high quality.

The method can also include a step 706 of obtaining the estimated range of source blocks from the DDR memory into cache memory optimized for random access operations. This step is used to enhance the efficiency and speed of the image warping operation. Cache memory, by design, is optimized for rapid random-access operations, making it significantly faster than accessing data directly from DDR memory for each operation. This characteristic of cache memory is especially beneficial in the context of image warping, where numerous, often non-sequential, memory accesses are required to apply the coordinate transformations specified in the warp specification.

The transition of source blocks from DDR to cache memory involves transferring the data segments identified in the previous step into a memory space where they can be accessed more swiftly by the processor. This operation minimizes latency and maximizes the throughput of the image warping process. By storing the necessary source blocks in cache memory, when the processor applies the coordinate transformations to generate warped image blocks, the processor can retrieve the relevant pixel data without significant delays. This is advantageous for maintaining a fluid and efficient workflow, particularly when processing large images or performing complex warping operations that require intensive computation.

Moreover, the use of cache memory optimized for random access operations aligns perfectly with the nature of image warping. Given that warping can lead to non-linear and unpredictable access patterns—due to the potential warp-induced displacements of pixels—having the source blocks readily available in a memory type that excels under these conditions is also advantageous. It allows the system to quickly adapt to the dynamic requirements of the warping process, ensuring that each pixel is processed correctly and efficiently, regardless of its final position in the warped image.

Upon fetching the estimated range of source blocks from DDR memory, these blocks are transferred into cache memory. The cache memory, designed for swift random access, facilitates immediate retrieval of data as the processor applies the set of coordinate transformations to generate the warped image blocks. This optimization is crucial for maintaining a fluid and efficient workflow, especially when the warping process involves complex transformations that require rapid, often non-sequential, memory accesses.

By leveraging the optimized capabilities of cache memory, the method ensures that the processor can access the necessary pixel data with minimal delay. The strategic use of cache memory, thus, not only enhances the performance of the warping process but also contributes to the system's overall efficiency by minimizing processing times and ensuring the high-speed execution of warping transformations.

In some embodiments, the method includes a step 708 of generating warped image blocks by applying the set of coordinate transformations to pixels within the estimated range of source blocks. Each warped image block may correspond to a portion of the warped image.

Generating warped image blocks constitutes a part of the image warping process, where the conceptual transformations prescribed by the warp specification are actualized into tangible modifications on the image itself. This step utilizes the source blocks previously fetched from DDR memory and temporarily stored in cache memory, capitalizing on the rapid access times cache memory offers. Within this context, the complexity of the coordinate transformations becomes a factor. The warp specification may dictate quadratic, cubic, or other types of nonlinear warps, each bringing a distinct level of complexity and visual alteration to the image.

Quadratic warp transformations, characterized by quadratic equations, facilitate parabolic changes, enabling subtle yet more complex image manipulations than linear adjustments. Cubic warps, rooted in cubic equations, introduce even more profound alterations, allowing for significant bends and curves. Nonlinear transformations encompass these and other complex warp types, enabling a broad spectrum of effects to include dramatic reshaping of the image.

The processor applies the set of coordinate transformations to each pixel within these blocks, recalculating their positions according to the warp specification. The decision to employ quadratic, cubic, or other nonlinear transformations directly influences the intricacy of the warping process. These transformations demand precise calculations to ensure that every pixel is accurately repositioned, reflecting the intended warp effect without losing the integrity of the original image.

This process involves a mathematical re-mapping of pixel locations from the source image to their new destinations in the output image, following the warp-induced alterations. The transformations might include scaling, rotation, skewing, or more complex deformations, depending on the goals of the warping operation. The complexity introduced by quadratic, cubic, or other nonlinear warps is managed through careful interpolation of new pixel values, ensuring that the warped image blocks retain the visual fidelity of the original content.

This step also illustrates the adaptability of the image warping process to handle complex, non-linear transformations. By breaking down the image into blocks and processing each with respect to the specified transformations, the method achieves a high degree of control over the warping process. This not only facilitates the handling of intricate warp specifications but also allows for the efficient parallel processing of different image segments, potentially speeding up the overall operation.

In one embodiment, the method includes a step 710 of assembling the warped image from the generated warped image blocks and storing the assembled warped image in the DDR memory. Each generated warped image block, having undergone the prescribed set of coordinate transformations, represents a fragment of the overall image. These blocks must be accurately positioned relative to one another, adhering to the new geometry defined by the warp specification.

Once assembled, the coherence of the transformed image is seen. The pixels, now occupying their new positions, collectively manifest the transformations—be it a stretch, a bend, or a complete reshaping—that were conceptualized at the outset. This step of the process involves transferring the assembled warped image back into DDR memory. This step is not merely a matter of storage but signifies the readiness of the warped image for further use—whether for display, analysis, or as input for subsequent processing stages. DDR memory, with its balance of speed and capacity, serves as a repository for the newly transformed image, ensuring that the data remains readily accessible for any future operations. Storing the image back in DDR memory also underscores the cyclic nature of digital image processing workflows. Data moves from DDR memory to cache and back again, reflecting a continual exchange between storage media and processing units. In some embodiments, the data does not need to move back to DDR memory. The data can go into an Neural Processing Unit (NPU) and the output of the NPU may be image data or non-image data.

In some instances, the method can include identifying displacement requirements for source image process. This process begins with a detailed analysis of the warp specification, a set of instructions that delineates the coordinate transformations to be applied to the digital image. The warp specification serves as a blueprint for how the image is intended to be transformed, outlining the necessary adjustments to pixel positions to achieve the desired warping effect.

By analyzing the warp specification, the method enables the identification of displacement requirements for source image blocks. This step is included for understanding how pixels within the image are expected to shift or be displaced as a result of the applied transformations, thereby ensuring that all necessary pixel data is considered in the warping process. The analysis of the warp specification allows for anticipation of these displacements, facilitating a more targeted and efficient fetching of source blocks from DDR memory.

Further enhancing the robustness of the method is the dynamic adjustment of the estimated range of source blocks. This adjustment is predicated on the insight gained from analyzing the warp specification and the displacement requirements thus identified. Recognizing that warp-induced displacements can cause pixels to move in a manner that may not align with initial estimations, the method proactively expands the estimated range of source blocks within the DDR memory. This expansion ensures that the range encompasses all determined pixels for generating each output block, effectively accounting for potential warp-induced displacements dictated by the coordinate transformations.

In one or more embodiments, the method incorporates a strategic approach to managing access to DDR memory during the image warping process. This strategy involves the anticipatory fetching of source blocks. By proactively identifying and retrieving the necessary source blocks from DDR memory ahead of their actual use in generating warped image blocks, the method addresses several aspects of the warping process.

One of the benefits of this strategic fetching is its ability to mitigate potential OOB pixel scenarios. Out-of-bounds pixels occur when the coordinate transformations specified in the warp specification result in pixel positions that extend beyond the initially estimated boundaries of the source image. These scenarios can introduce complexities in accurately assembling the final warped image, potentially compromising the visual integrity of the output. By strategically fetching source blocks in anticipation, the method ensures that all relevant image data, including pixels that might otherwise fall outside expected boundaries, is readily available when needed. This foresight significantly reduces the likelihood of encountering OOB scenarios, thereby maintaining the continuity and quality of the warped image.

Moreover, the anticipatory nature of this fetching strategy enhances processing efficiency by reducing the frequency of memory fetch operations. Accessing DDR memory is a resource-intensive task that can impact the overall speed of the image warping process. By strategically retrieving and caching the necessary source blocks before they are required for transformation, the method minimizes the need for repeated and potentially redundant memory access operations. This optimization of DDR memory access not only accelerates the warping process but also contributes to a more efficient utilization of system resources, enabling faster and more fluid image manipulation.

In some instances, generating warped image blocks involves transforming source image blocks based on the warp specification to produce portions of the warped image, ensuring continuity and integrity of the image data during the warping process. The method employs a detailed procedure for generating warped image blocks, a central aspect of transforming digital images according to specific warp specifications. This process begins with the transformation of source image blocks, which are segments of the original image data stored within DDR memory. One or more source blocks are altered based on a set of coordinate transformations detailed in the warp specification. These transformations are applied to each pixel within the source blocks, recalculating their positions to conform to the desired warping effect—be it a stretch, twist, or an entirely unique deformation.

One objective of this transformation process is to ensure the continuity and integrity of the image data throughout the warping process. The method achieves this by managing how each pixel's new position and value are determined and integrated into the warped image blocks. This maintains the visual coherence of the warped image, preventing issues such as tearing, stretching, or other artifacts that could detract from the image's overall quality.

The generated warped image blocks represent discrete sections of the transformed image. These blocks are then assembled to form the complete warped image. However, generating these blocks is not merely about applying mathematical transformations; it also involves ensuring that the transitions between blocks are seamless and that the overall structure of the image remains intact. This includes preserving the relationships between pixels and their neighbors, even as they are moved to new positions, to maintain the visual and structural fidelity of the original image.

Furthermore, the process of generating warped image blocks underscores the adaptability of the method to a variety of warping demands. Whether the specification calls for simple linear transformations or more complex nonlinear deformations, the method is equipped to handle these requirements with precision. This flexibility is instrumental in allowing for a broad range of creative and functional image manipulations, facilitating applications across different domains, from graphic design to augmented reality.

In one embodiment, the method includes managing the fetched source blocks within the cache memory to support efficient access during the image warping process. The method incorporates a strategic approach to managing fetched source blocks within cache memory, which plays a role in supporting efficient access during the image warping process. This step is designed to optimize the workflow of transforming digital images by leveraging the speed and accessibility advantages of cache memory.

Upon fetching the estimated range of source blocks from DDR memory, these blocks are stored in cache memory. The management of source blocks within the cache involves an organization of data to ensure that the most frequently accessed blocks are readily available to the processor. This optimization reduces the need for repeated fetches from the slower DDR memory, thereby enhancing the overall efficiency of the image warping process. The method employs algorithms that predict which source blocks will be needed next based on the current stage of the warping operation and the specific transformations being applied. This predictive fetching mechanism ensures a smooth and continuous flow of data between the cache memory and the processor, minimizing delays and maximizing throughput.

Furthermore, this step of managing fetched source blocks in cache memory allows for a more dynamic response to the demands of the warping process. As the method processes each block, adjustments to the cache's contents are made in real-time, adapting to the evolving requirements of the transformation. This dynamic management helps in avoiding bottlenecks and ensures that the warping process can proceed without interruption, maintaining a high level of performance even as the complexity of the warp increases.

The method can also include assessing the output blocks to ensure conformity with expected outcomes of the warp specification to facilitate the identification and correction of discrepancies in the warped image. This step is useful for identifying and correcting any discrepancies in the warped image, ensuring the final result aligns precisely with the intended visual effects and corrections. Through this process, the method guarantees the integrity and accuracy of the warped image, addressing any potential deviations from the specified transformation objectives.

The method can also include detecting OOB pixel coordinates that result from applying the warp specification, which indicate source blocks falling outside the estimated range. In some instances, in response to detecting OOB pixel coordinates, the method includes expanding the estimated range of source blocks to include additional blocks from the DDR memory that encompass the OOB pixel coordinates, and repeating the fetching, generating, and assembling steps for the expanded range.

That is, the method integrates an approach to manage OOB pixel coordinates that emerge during the warping process. Initially, it involves a process of detecting OOB pixel coordinates—pixels that, due to the warping transformations specified, would fall outside the initially estimated range of source blocks. These OOB occurrences indicate that the current estimation does not encompass all necessary image data, which is crucial for accurately rendering the warped image. Upon detecting such OOB pixel coordinates, the method dynamically expands the estimated range of source blocks. This expansion includes incorporating additional blocks from the DDR memory that surround and cover the detected OOB coordinates, effectively ensuring that no critical pixel data is missed.

In yet other embodiments, the method includes recalculating the estimated range of source blocks to preemptively incorporate any potential OOB pixel coordinates, ensuring comprehensive coverage of necessary source blocks from the DDR memory in a single operation. Stated otherwise, to optimize the warping process and preemptively address potential OOB scenarios, the method recalculates the estimated range of source blocks. This recalibration is designed to include any pixels that might shift beyond the initial estimations due to the warp, thereby preemptively encompassing a broader spectrum of the source image. By doing so, the method secures comprehensive coverage of necessary source blocks in a single streamlined operation, significantly enhancing the efficiency and accuracy of the image warping process. This dual strategy of dynamically adjusting for OOB pixels and preemptively expanding the source block estimation ensures the warped image's integrity and completeness, even under complex warping conditions.

In certain embodiments, an alternative method for addressing out-of-bounds (OOB) pixels during image warping is disclosed. This method comprises precomputing warped coordinates for each pixel within the output block. Subsequently, these precomputed coordinates are utilized to ascertain the precise range of source blocks required from the dynamic random-access memory (DDR). This approach obviates the necessity for OOB pixel detection and guarantees the absence of OOB pixels within the warped image.

Furthermore, in accordance with specific embodiments, the aforementioned precomputation method may entail a dynamic recalculation of the estimated range of source blocks. This recalculation is designed to preemptively encompass any potential OOB pixel coordinates, thereby ensuring comprehensive coverage of all requisite source blocks within a single memory access operation. Such a strategy enhances the efficiency and accuracy of the image warping process, particularly under complex warping conditions.

Figure 8:
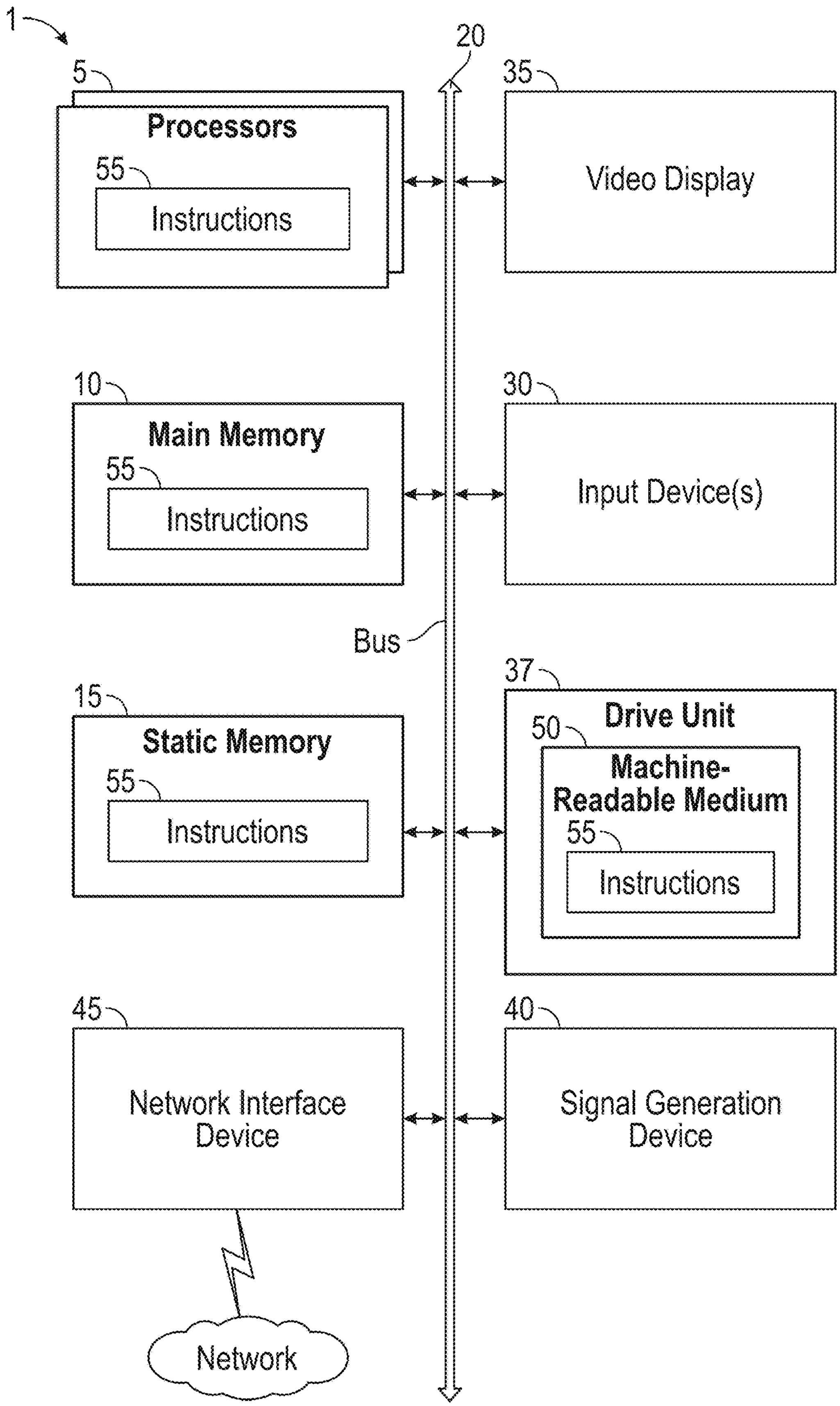
FIG. 8 is a diagrammatic representation of an example machine in the form of a computer system.

FIG. 8 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Where appropriate, the functions described herein can be performed in one or more of hardware, software, firmware, digital components, or analog components. For example, the encoding and or decoding systems can be embodied as one or more application specific integrated circuits (ASICs) or microcontrollers that can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A method for efficient image warping utilizing double a data rate (DDR) memory, comprising:
receiving, by a processor of a computing device, an input digital image stored within the DDR memory and a warp specification that includes coordinate transformations;
fetching an estimated range of source blocks within the DDR memory that correspond to an output block of a warped image based on the warp specification, where the estimated range of source blocks accounts for potential warp-induced displacements of pixels;
obtaining the estimated range of source blocks from the DDR memory into cache memory optimized for random access operations;
generating warped image blocks by applying the coordinate transformations to the pixels within the estimated range of source blocks, where each warped image block corresponds to a portion of the warped image; and
assembling the warped image from the generated warped image blocks and storing the assembled warped image.

2. The method of claim 1, further comprising identifying displacement requirements for source image blocks by analyzing the warp specification.

3. The method of claim 2, further comprising dynamically adjusting the estimated range of source blocks to encompass determined pixels for generating each output block, in view of the potential warp-induced displacements within the DDR memory, based on the coordinate transformations specified in the warp specification.

4. The method of claim 1, wherein generating the warped image blocks includes transforming source image blocks based on the warp specification to produce portions of the warped image.

5. The method of claim 1, further comprising managing the source blocks that have been fetched, within the cache memory to support efficient access to the source blocks during image warping.

6. The method of claim 1, further comprising assessing the generated warped image blocks to ensure conformity with the warp specification and facilitate identification and correction of discrepancies in the warped image.

7. The method of claim 1, further comprising detecting any out-of-bounds (OOB) pixel coordinates that result from applying the warp specification, which indicate source blocks falling outside the estimated range.

8. The method of claim 7, further comprising: in response to detecting the OOB pixel coordinates, expanding the estimated range of source blocks to include additional blocks from the DDR memory that encompass the OOB pixel coordinates, and repeating the fetching, generating, and assembling steps for the estimated range that has been expanded.

9. The method of claim 8, further comprising recalculating the estimated range of source blocks to preemptively incorporate potential OOB pixel coordinates.

10. A method for image warping in a computing device, comprising:
receiving an input digital image stored within a memory and a warp specification that includes coordinate transformations;
fetching an estimated range of source blocks within the memory that correspond to an output block of a warped image based on the warp specification, wherein the estimated range of source blocks accounts for potential warp-induced displacements of pixels;
obtaining the estimated range of source blocks from the memory into a cache;
generating warped image blocks by applying the coordinate transformations to the pixels within the estimated range of source blocks, wherein generating includes interpolating pixel values at destination coordinates; and
assembling the warped image from the generated warped image blocks and storing the assembled warped image back into the memory.

11. The method of claim 10, wherein fetching an estimated range of source blocks includes calculating the estimated range of source blocks based on corners of the output block as established in the warp specification.

12. The method of claim 10, further comprising determining out-of-bounds (OOB) pixels that result from applying the coordinate transformations, and adjusting an estimated range of source blocks to include the OOB pixels.

13. The method of claim 10, wherein obtaining the estimated range of source blocks from the memory into the cache further comprises updating the cache with the source blocks that have been fetched to facilitate generating the warped image blocks.

14. The method of claim 10, wherein generating the warped image blocks further involves adjusting output pixel coordinates within the estimated range of source blocks before applying the coordinate transformations.

15. The method of claim 10, further comprising recalculating the estimated range of source blocks if an initial estimation does not fully encompass data for generating the warped image blocks due to warp-induced displacements.

16. The method of claim 10, wherein assembling the warped image includes sequentially placing the warped image blocks according to transformed coordinates to form the warped image.

17. A system for efficient image warping utilizing a double data rate (DDR) memory, comprising:
a processor; and
a memory architecture configured to store instructions that are executed by the processor to:
receive an input digital image stored within the DDR memory and a warp specification that includes coordinate transformations;
fetch an estimated range of source blocks within the DDR memory that correspond to an output block of a warped image based on the warp specification, where the estimated range of source blocks accounts for potential warp-induced displacements of pixels;
obtain the estimated range of source blocks from the DDR memory into cache memory optimized for random access operations;
generate warped image blocks by applying the coordinate transformations to the pixels within the estimated range of source blocks, where each warped image block corresponds to a portion of the warped image; and
assemble the warped image from the generated warped image blocks and store the assembled warped image in the DDR memory.

18. The system of claim 17, wherein the processor is configured to dynamically adjust the estimated range of source blocks within the DDR memory based on the warp specification to include the pixels for generating each output block, manage access to the DDR memory by strategically fetching source blocks, and expand the estimated range to include additional blocks that encompass out-of-bounds (OOB) pixel coordinates detected from applying the warp specification.

19. The system of claim 17, wherein the processor is configured to transform source image blocks based on the warp specification to produce warped image blocks, and manage the fetched source blocks within cache memory to support efficient access and facilitate identification and correction of discrepancies in the warped image.

20. The system of claim 17, wherein the processor is configured to preemptively recalculate the estimated range of source blocks to incorporate OOB pixel coordinates.

* * * * *